May 23, 1950  E. H. WALLACE  2,509,117
METHOD OF MAKING COMPOSITE WIRE
Filed July 24, 1946
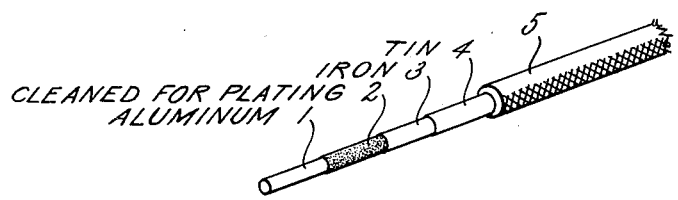
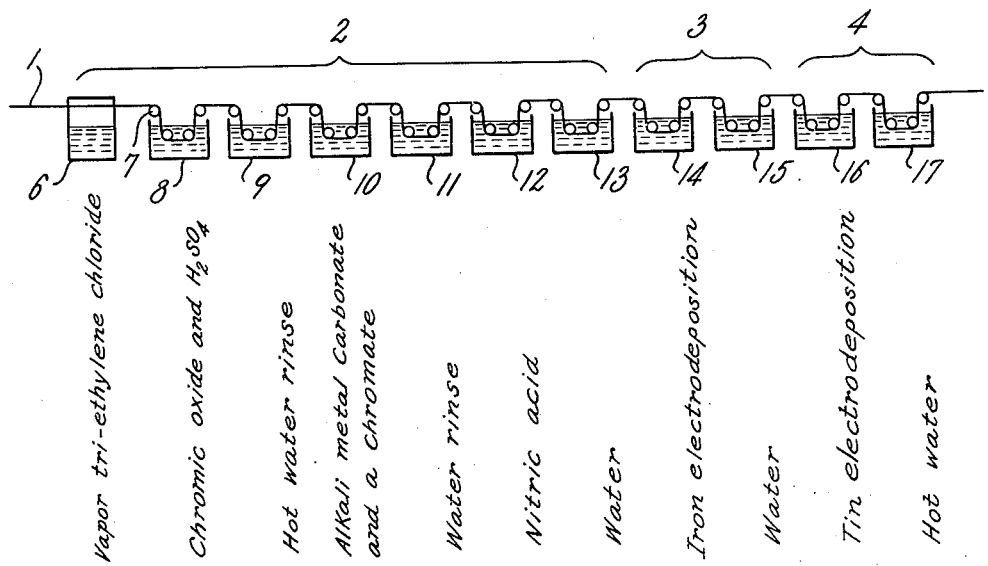
INVENTOR
EDWARD H. WALLACE
BY
Charles C. Willson
ATTORNEY Patented May 23, 1950

2,509,117

UNITED STATES PATENT OFFICE 2,509,117

METHOD OF MAKING COMPOSITE WIRE

Edward H. Wallace, Detroit, Mich., assignor to United States Rubber Company, New York, N. Y., a corporation of New Jersey Application July 24, 1946, Serial No. 686,044

1 Claim. (Cl. 204—33)

This invention relates to a composite wire, and in particular it relates to an aluminum conductor wire having a tin outer surface and to a process for producing the same.

Aluminum wire, because of its high electrical conductivity and because of its lightness, is particularly useful as a medium for conveying electrical energy. However, aluminum wire as such possesses the objectionable feature of being difficult to solder, such as in the formation of good electrical joints. Certain special fluxes and compounds have been used to facilitate soldering aluminum, but the materials and methods commonly available for joining copper wire will not function with aluminum. As a result of this deficiency the advantages of the use of aluminum wire has not materialized.

In accordance with the practice of my invention, I provide an aluminum wire and a process for treating such wire so that the wire may be readily soldered by employing conventional soldering methods. In general, my invention includes the steps of treating aluminum wire in such a manner as to permit the adhesion of electrodeposited iron thereon. After the iron is deposited, the coated aluminum wire is treated by tinning the surface of the electrodeposited iron. This tinning operation may be performed by electrodeposition or by dipping the wire directly into a hot tinning bath. The coatings of iron and tin are relatively thin and do not interfere substantially with the predominating characteristics of the aluminum wire. It is therefore possible by my process to produce an aluminum wire useful for electrical purposes, and which not only may be used competitively with conventional copper wire but provides the highly desirable feature of light weight.

The reason for providing the aluminum wire with a thin film of iron electrodeposited upon the aluminum is that tin will not bond satisfactorily to an aluminum surface.

Among the objects of my invention are to provide an aluminum wire having soldering characteristics comparable to that of the conventional tinned copper wiring; to provide an easily solderable wire having high electrical conductivity and which is light in weight; to provide a tinned aluminum wire in which a high degree of adhesion is obtained between the tin and the aluminum by the use of an intermediary film; to provide a composite aluminum wire having a tinned outer surface and underlying intermediary surface in which the tinned layer and intermediate layer form no substantial change in the thickness or other predominating characteristics of the aluminum; and to provide a tin coated aluminum wire which may be made according to a process which is continuous, expeditious, and economical.

These and other objects and advantages will appear more fully in the following detailed description when considered in connection with the accompanying drawing, in which:

Figure 1 illustrates an aluminum wire forming an embodiment of my invention; and Figure 2 is a diagrammatic view illustrating a process useful in the formation of the coated aluminum wire.

With reference to the drawing and in particular to Figure 1, I illustrate an embodiment of my invention in the form of solderable aluminum wire in which the number 1 designates an aluminum wire or core. By reference to aluminum, I contemplate pure aluminum and aluminum alloys in which aluminum is the predominating metal. As shown in Figure 1, the surface 2 of the aluminum is treated so as to permit the adhesion of electrodeposited iron 3 thereon. After a flash plate of the iron 3 is deposited on the treated aluminum, the wire is immersed into a bath capable of forming an electrodeposit of tin 4 on the iron surface. It is to be understood, however, that instead of electrodepositing the tin on the iron surface, the tin may be applied directly to the iron in a dipping operation of the wire in hot tin. Also, the tin may be applied by first producing a flash electrodeposit of tin on the iron surface and thereafter building up the thickness of the tin deposit by means of dipping the coated wire in a hot tin bath.

In coating the aluminum wire with a layer of electrodeposited iron, it is merely necessary that the deposited iron have a thickness of approximately .0003 inch to enable the tin to bond thereto. The thickness of the tin deposited, however, should be slightly greater because it is necessary for the tin coating to be subjected to ordinary wear and handling, particularly at those locations where the wire is to be soldered. The thickness of the tin, therefore, should be in the order of .001 inch. Since, according to my invention, the deposited layers of metal or other treatments are performed in a continuous operation, it is also possible in the same continuous operation to coat the wire with a suitable electrical insulating covering 5. The covering may be in the form of extruded rubber or synthetic rubber, or impregnated fabric or a combination thereof.

A wire as thus formed includes a high bond relationship between the iron and the aluminum. Also a high bond is obtained between the iron and the tin. The thickness of the electrodeposited layers is such that neither the wire nor the tin interfere substantially in the flexing properties of the wire. On the other hand, the wire possesses all of the desirable characteristics of conventional copper wire such as in electrical conductivity and in its capability of being easily soldered. In addition, the composite aluminum wire possesses the beneficial characteristic of being much lighter in weight.

In carrying out the treatment of the wire in a continuous process reference may be had to Figure 2 which illustrates, diagrammatically, the different successive steps employed to obtain the resulting composite wire. The bare wire 1 is first moved through a container 6 for degreasing the wire. This degreasing operation is conducted by the vapor method in which tri-ethylene chloride is heated within a container 6 and the vapors therefrom react upon the wire for degreasing purposes.

Following the degreasing operation the aluminum wire is carried over a series of rollers 7 into successive stages of operation for treating the aluminum prior to plating. After the aluminum wire is cleaned the wire enters a tank 8 containing a bath or solution raised to the boiling point. An example of such a solution contained in the tank 8 comprises 2.5 grams per liter of chromic oxide and 99 cc. per liter of sulphuric acid. This treatment is primarily a cleaning operation for removing any oxide deposits previously formed on the surface of the wire, and for providing a uniform base onto which the next coating is formed. Following this operation the aluminum wire is rinsed in clean hot water. This takes place in a container 9.

The next step in the treatment of the aluminum is to produce thereon an oxide coated surface. This is accomplished by treating the wire in a container 10 of an alkali solution comprising an alkali metal carbonate and a chromate. An example of the composition used in this solution is sodium carbonate and potassium dichromate in a ratio of 3 to 1.

The wire is rinsed by conducting the wire through a bath 11 of water.

The next step in the operation is the treatment of the oxide coating on the aluminum wire. In this operation the wire is dipped into a bath 12 containing about .5% to 70% nitric acid to etch the oxide coating so that an electro-plated coating will bond firmly thereto. Following this operation the aluminum wire is again rinsed in clean water 13 and it is ready for the electroplating operation. I have found that in order to obtain a good bond between aluminum and other metals, it is desirable to first coat the treated aluminum with a layer of electrodeposited iron. This is accomplished in the bath 14. The electroplating of the iron to the aluminum may be carried on in any recognized iron plating solution. Good results can be obtained by using a solution consisting essentially of 325 to 425 grams per liter of ferrous chloride and 125 grams per liter of calcium chloride. An iron flash deposit as thin as .0001 inch will produce satisfactory results for subsequently forming a bond with the electrodeposited tin. Preferably, however, the electrodeposited iron should have a thickness in the order of .0003–.0005 inch. Following the flash iron plate, the wire is again rinsed in a water bath 15. Having secured a firm bond between the electrodeposited iron and the treated aluminum the next step in the operation is to tin the iron. The preferred practice of conducting this operation is to immerse the iron coated wire into a bath 16 for electrodepositing thereon a layer of tin. An example of such a tin bath is as follows, wherein "per gal." means per gallon of water:

| | Oz. per gal. |
|---|---|
| Stannous sulphate | 13 |
| Sulphuric acid | 4 |
| Tartaric acid | 4 |
| Glue | .4 to .8 |
| Cresol | .8 |

A final step in the treatment of the composition wire is to dip the wire into a bath of hot water so as to remove all traces of the solution of the bath. Thereafter the wire is completed and if desired, it may be coated with insulating material in accordance with conventional practices. As a modified form of the invention, the wire, after it leaves the hot water bath 17, may be immersed into a hot tin bath (not shown) so that the tin may be built up to the desired thickness at a more rapid rate than that possible in the electrodeposition of the tin.

It is to be understood that the wire as thus produced, in accordance with the practice of my invention, possesses a high degree of bond between the adjacent layers so that the wire in effect is an integral unit capable of being bent and manipulated in substantially the same manner as untreated aluminum wire and with the added feature of the wire being light in weight and readily solderable.

As thus shown and described, it is believed apparent that I have provided a novel arrangement whereby aluminum wire is converted so as to possess all of the desirable characteristics of tinned copper wire plus the exceptional advantageous characteristic of lightness. While I have shown and described a preferred embodiment and process of my invention, it is to be understood that it is susceptible of those modifications which appear obviously within the spirit of the invention and as appearing in the scope of the appended claim.

Having thus described my invention what I claim and desire to protect by Letters Patent is:

The method of forming a tinned aluminum conductor wire of composite laminae in which adjacent layers of deposited metals are securely bonded together comprising the steps; cleaning the aluminum wire with a solution containing a small amount of chromic oxide and sulphuric acid; then immersing the wire in a solution of an alkali metal carbonate and a chromate to provide an oxide coat on the aluminum; then treating the wire with nitric acid to etch the oxide coat; then electrodepositing a layer of iron on the etched surface, and finally applying over the iron a protecting coating of tin.

EDWARD H. WALLACE.

REFERENCES CITED

The following references are of record in the file of this patent:

UNITED STATES PATENTS

| Number | Name | Date |
|---|---|---|
| 440,952 | Land | Nov. 18, 1890 |
| 628,770 | Cowper-Coles | July 11, 1899 |
| 1,975,818 | Work | Oct. 9, 1934 |
| 1,988,645 | Bowden | Jan. 22, 1935 |
| 2,055,393 | Thomas | Sept. 22, 1936 |
| 2,162,789 | Raub | June 20, 1939 |
| 2,233,410 | Frasch | Mar. 4, 1941 |

FOREIGN PATENTS

| Number | Country | Date |
|---|---|---|
| 3,439 | Great Britain | of 1910 |
| 548,330 | Great Britain | of 1942 |